United States Patent
McKay et al.

(10) Patent No.: US 9,574,971 B2
(45) Date of Patent: Feb. 21, 2017

(54) MONITORING COLD START EMISSION REDUCTION STRATEGY

(71) Applicant: GM GLOBAL TECHNOLOGY OPERATIONS LLC, Detroit, MI (US)

(72) Inventors: Kevin J. McKay, New Hudson, MI (US); Steve L. Melby, Howell, MI (US); Chad E. Marlett, Plymouth, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 298 days.

(21) Appl. No.: 14/311,861

(22) Filed: Jun. 23, 2014

(65) Prior Publication Data

US 2015/0369105 A1    Dec. 24, 2015

(51) Int. Cl.
- *G01M 15/10* (2006.01)
- *F02D 41/06* (2006.01)
- *F02D 41/00* (2006.01)
- *F02D 41/28* (2006.01)

(52) U.S. Cl.
CPC .......... *G01M 15/102* (2013.01); *F02D 41/064* (2013.01); *F02D 41/005* (2013.01); *F02D 2041/286* (2013.01); *F02D 2200/021* (2013.01); *F02D 2200/101* (2013.01); *F02D 2200/703* (2013.01)

(58) Field of Classification Search
CPC .............. F02D 41/064; F02D 2041/286; F02D 2200/021;F02D 2200/101; F02D 2200/703; F02D 41/005; F01N 11/002; F01N 11/005; F01N 2550/02; G01M 15/102
USPC ...................................................... 73/114.74
See application file for complete search history.

(56) References Cited

U.S. PATENT DOCUMENTS

| | | | | |
|---|---|---|---|---|
| 6,101,442 A * | 8/2000 | Lewandowski | ........... | F01L 1/46 701/114 |
| 6,513,322 B2 * | 2/2003 | Ohuchi | ................ | F02D 41/024 60/284 |
| 7,630,826 B2 * | 12/2009 | Wang | .................... | F02D 41/064 701/113 |
| 9,227,625 B2 * | 1/2016 | Rieker | ................. | B60W 20/10 |
| 2007/0283682 A1 * | 12/2007 | Cullen | ................. | F01N 11/002 60/284 |
| 2009/0265086 A1 * | 10/2009 | Iihoshi | ................. | F02D 41/064 701/113 |

* cited by examiner

*Primary Examiner* — Freddie Kirkland, III
(74) *Attorney, Agent, or Firm* — Cantor Colburn LLP

(57) ABSTRACT

A method for assessing a cold start emission reduction (CSER) strategy applied to an engine system is provided. The method determines a first accumulation value based on an estimated output signal that would result from applying a first control command to the engine system. The method determines a second accumulation value based on a measured output signal resulting from applying a second control command that implements the CSER strategy to the engine system. The method compares the first accumulation value and the second accumulation value. The method determines whether the applying the second command to the engine system achieved a performance threshold of the CSER strategy based on the comparing.

16 Claims, 3 Drawing Sheets

MONITORING COLD START EMISSION REDUCTION STRATEGY

FIELD OF THE INVENTION

The subject invention relates to monitoring cold start emission reduction (CSER) strategies and, more specifically, to assessing CSER strategies applied to an engine system by examining output signals from the engine system.

BACKGROUND

Manufacturers of internal combustion engines, particularly diesel engines, are presented with the challenging task of complying with current and future emission standards for the release of nitrogen oxides, particularly nitrogen monoxide, as well as unburned and partially oxidized hydrocarbons, carbon monoxide, particulate matter, and other particulates. In order to reduce the emissions of internal combustion engines, a number of different strategies are being used. For example, exhaust gas recirculation ("EGR") techniques are utilized in some conventional internal combustion engines to reduce the level of nitrogen oxides in the exhaust gas.

During a cold start of an internal combustion engine, a quantity of emissions from the engine is relatively large compared to a quantity of emissions from the engine after the engine is heated up to a certain temperature. In order to reduce the emissions more effectively during a cold start of the engine, emissions reduction strategies applied during a cold start are different than emissions reduction strategies applied when the engine is warmed up. Some regulation standard requires that the emission reduction strategies be monitored and diagnosed. It is, therefore, desirable to provide methods and systems to monitor and assess cold start emission reduction strategies.

SUMMARY OF THE INVENTION

In one exemplary embodiment of the invention, a method for assessing a cold start emission reduction (CSER) strategy applied to an engine system is provided. The method determines a first accumulation value based on an estimated output signal that would result from applying a first control command to the engine system. The method determines a second accumulation value based on a measured output signal resulting from applying a second control command that implements the CSER strategy to the engine system. The method compares the first accumulation value and the second accumulation value. The method determines whether the applying the second command to the engine system achieved a performance threshold of the CSER strategy based on the comparing.

In another exemplary embodiment of the invention provides an engine system comprising an engine and a control module for assessing a cold start emission reduction (CSER) strategy applied to the engine system. The control module comprises a processor coupled to a memory. The control module is configured to determine a first accumulation value based on an estimated output signal that would result from applying a first control command to the engine system, to determine a second accumulation value based on a measured output signal resulting from applying a second control command that implements the CSER strategy to the engine system, to compare the first accumulation value and the second accumulation value, and to determine whether the applying the second command to the engine system achieved a performance threshold of the CSER strategy based on the comparing.

In yet another exemplary embodiment of the invention provides a diagnostic system for assessing a cold start emission reduction (CSER) strategy applied to an engine system. The diagnostic system comprises a first module configured to determine a first accumulation value based on an estimated output signal that would result from applying a first control command to the engine system. The diagnostic system further comprises a second module configured to determine a second accumulation value based on a measured output signal resulting from applying a second control command that implements the CSER strategy to the engine system. The diagnostic system further comprises a third module configured to compare the first accumulation value and the second accumulation value. The diagnostic system further comprises a fourth module configured to determine whether the applying the second command to the engine system achieved a performance threshold of the CSER strategy based on the comparing.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
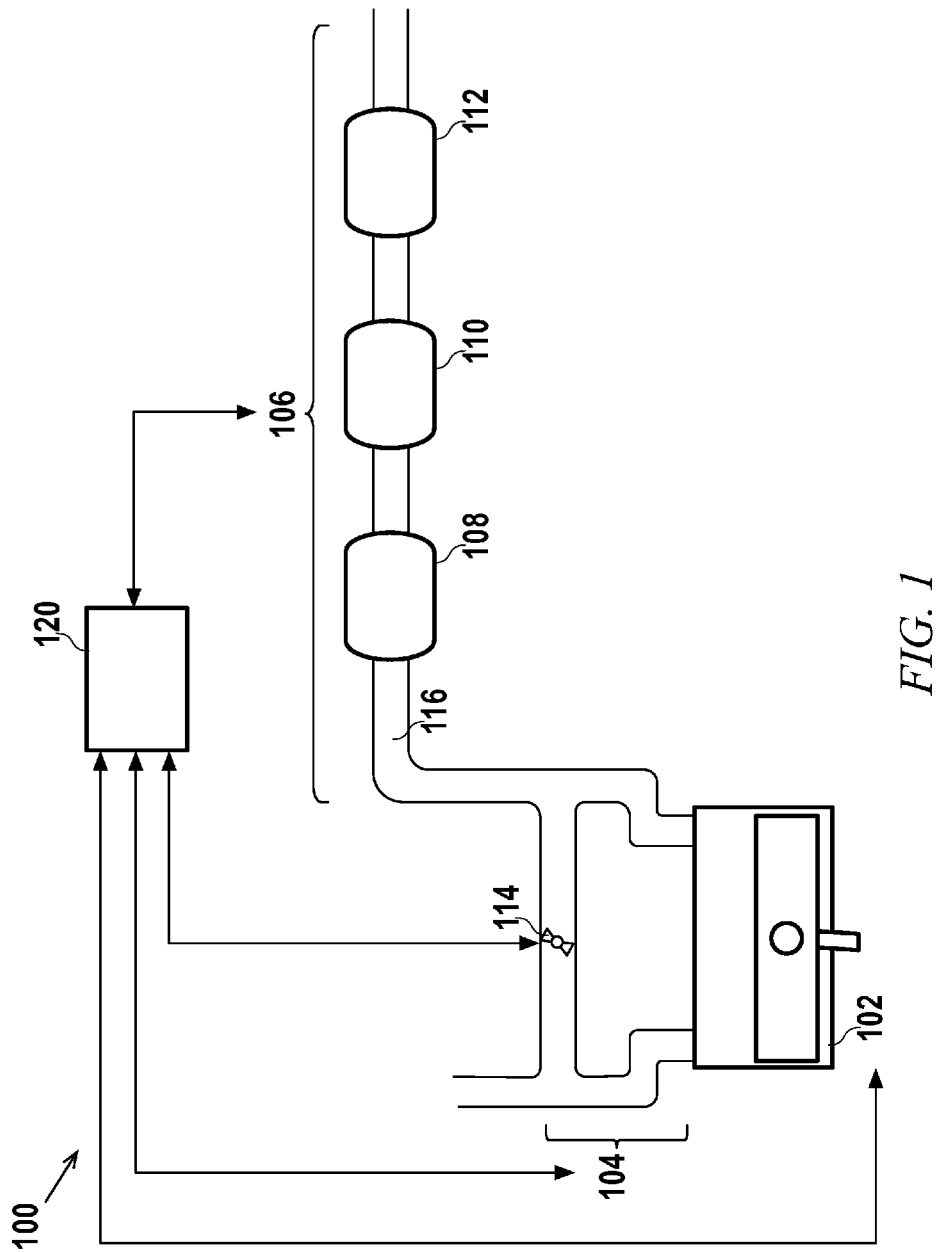
FIG. 1 depicts an engine system in accordance with exemplary embodiments of the invention.

The following description is merely exemplary in nature and is not intended to limit the present disclosure, its application or uses. It should be understood that throughout the drawings, corresponding reference numerals indicate like or corresponding parts and features.

In accordance with exemplary embodiments of the invention, FIG. 1 depicts an engine system 100 that includes a control module 120, an internal combustion engine 102, and a number of subsystems for reducing emissions from the internal combustion engine 102. As can be appreciated, the engine 102 can be of any engine type including, but not limited to, a diesel engine, a gasoline direct injection engine, a homogeneous charge compression ignition engine, or other engine type. The subsystems for reducing emissions from the engine 102 include an exhaust gas recirculation (EGR) system 104 and an exhaust gas treatment system 106.

The EGR system 104 generally includes an EGR valve 114 for controlling a flow rate of the exhaust gas to be recirculated to the engine 102. The EGR system 104 may also include other components such as a cooler for cooling the temperature of the exhaust gas to appropriate temperatures and one or more sensors for detecting operational parameters (e.g., temperature, pressure, etc.). These other components are not depicted in FIG. 1 for the simplicity of illustration and description.

The exhaust gas treatment system 106 generally includes one or more exhaust gas conduits 116 and one or more exhaust gas treatment devices. In an embodiment, the exhaust gas treatment devices may include an oxidation catalyst (OC) device 108, a selective catalytic reduction (SCR) device 110, a particulate filter (PF) 112 and/or other treatment device (not depicted). The operations and functionalities of the OC device 108, the SCR device 110, and the PF 112 are known in the art and the description of these exhaust gas treatment devices are omitted in this disclosure for the simplicity of description.

Sensors are also disposed in various locations of the engine 102, the EGR system 104, and the exhaust treatment system 106. These sensors include temperature sensors, pressure sensors, flow rate sensors, soot load sensors, nitrogen oxides (NOx) sensors, particulate sensors, engine speed sensors, to name just a few. These sensors are not depicted in FIG. 1 for the simplicity of illustration and description.

The control module 120 of the engine system 100 controls the rest of the engine system 100, e.g., the engine 102, the EGR system 104, and the exhaust gas treatment system 106, based on sensed and/or modeled signals and parameters. The signals and parameters can be received from the sensors disposed in different locations in the engine system 100. In an embodiment, the sensed and/or modeled signals include information about engine speed, fuel flow rate to the engine, air flow rate to the engine, engine coolant temperature, ambient temperature, atmospheric pressure, ambient temperature, fuel injection rate, exhaust gas temperature, exhaust flow rates, soot loads, NOx concentrations, exhaust gas constituencies (chemical composition) and many other parameters.

In an embodiment, the control module 120 is configured to apply one or more cold start emission reduction (CSER) strategies formulated based on sensed and/or modeled signals and parameters. As will be described in more details below, the control module 120 monitors outputs from the engine system 100 that result from applying one or more CSER strategies to the engine system 100.

Figure 2:
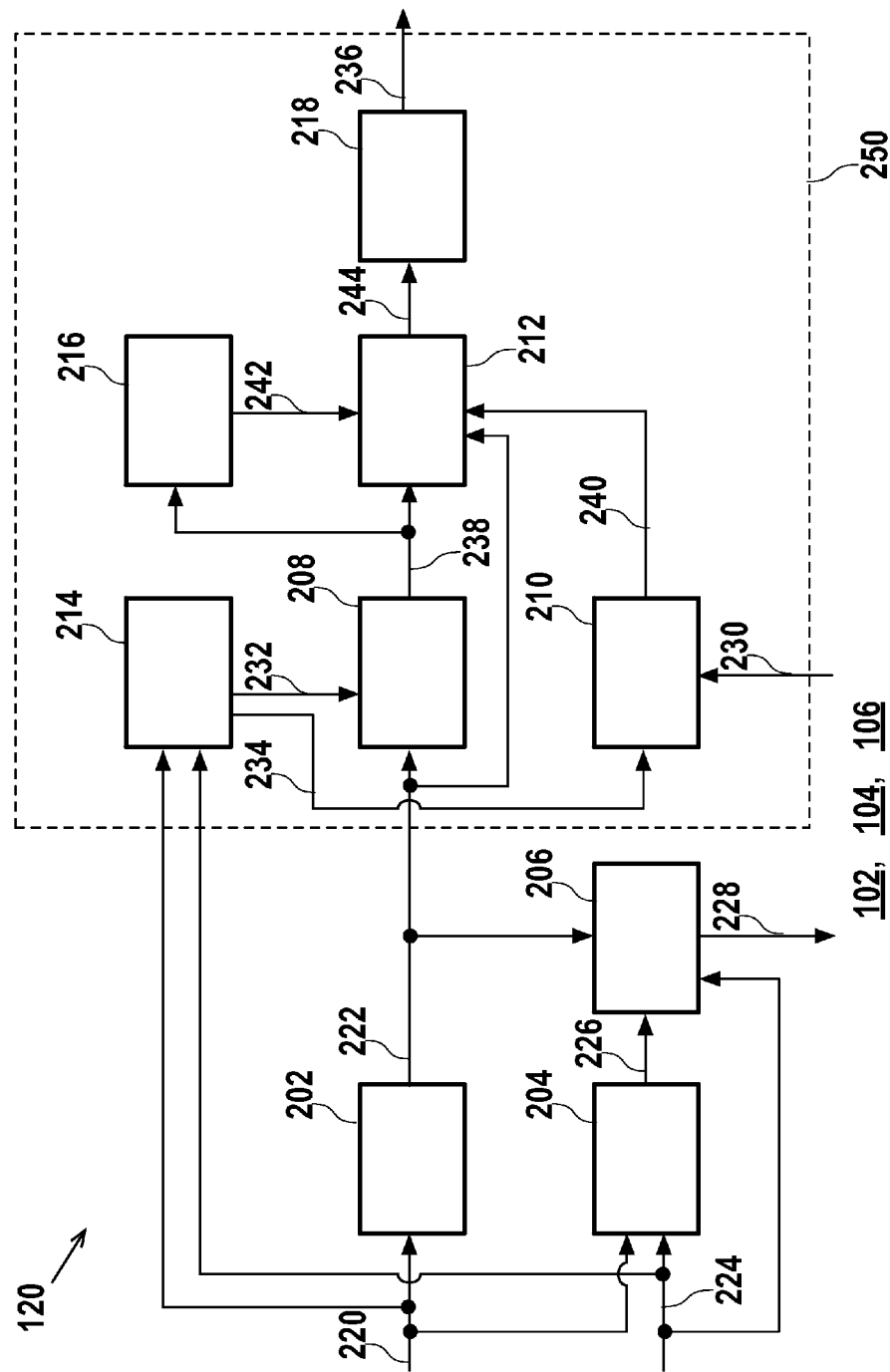
FIG. 2 depicts a block diagram of a control module in accordance with exemplary embodiments of the invention.

FIG. 2 depicts a block diagram of the control module 120 of FIG. 1 according to exemplary embodiments of the invention. The control module 120 includes several sub-modules—a base control command generation module 202, a cold start command generation module 204, a final control command generation module 206, and a diagnostic module 250.

The base control command generation module 202 is configured to generate a base control command 222 based on input signals 220. The base control command 222 is a signal for controlling one or more of the components of the engine 102, the EGR system 104, and the exhaust gas treatment system 106. For instance, the base control command 222 may be for controlling the EGR valve 114 of the EGR system 104 to adjust the flow rate of the exhaust gas to be recirculated into the engine 102.

The input signals 220 include signals supplied by the sensors disposed in different locations of the engine 102, the EGR system 104, and the exhaust gas treatment system 106. The input signals 220 may include signals processed and supplied by modules (not shown) other than the control module 120 or other sub-modules (not shown) of the control module 120. Depending on the purpose of the base control command, the base control command generation module 202 uses different input signals. For instance, when the base control command 222 is a command for controlling the EGR valve 114, the input signals 220 may include a fuel rate signal indicating a rate of fuel being supplied to the engine, an engine speed signal indicating the rotational speed of the engine, and an atmospheric pressure signal indicating the ambient air pressure. In an embodiment, the base control command generation module 202 generates the base control command using one or more lookup tables that include calibrated values indexed by the values of the inputs signals 220.

The base control command does not implement a CSER strategy. For instance, when the base control command 222 is a command for controlling the EGR valve 114, the base control command specifies the flow rate of the exhaust gas that is determined to be suitable for the engine when the temperature of the engine 102 is above a threshold temperature. That is, the base control command 222 implements an emission strategy for a "hot" engine. In contrast, a cold start control command or signal 226 generated by the cold start control command generation module 204 implements a CSER strategy. For instance, when the cold start control command 226 is for controlling the EGR valve 114, the cold start command control command 226 specifies flow rate of the exhaust gas that is determined to be suitable during a cold start of the engine 102—e.g., when the engine 102's temperature is less than or equal to the threshold temperature.

In an embodiment, the cold start control command generation module 204 is configured to generate the cold start control command 226 based on input signals 224 in addition to the input signals 220 that the base control command generation module 202 uses. The additional input signals 224 are signals that are used to formulate a CSER strategy. Like the input signals 220, the additional input signals 224 may include signals processed and supplied by modules (not shown) other than the control module 120 or other sub-modules (not shown) of the control module 120. Depending on the purpose of the cold start control command, the cold start control command generation module 204 uses different input signals. For instance, when the cold start control command 226 is a command for controlling the EGR valve 114, the input signals 224 may include an intake air temperature signal indicating the temperature of the air supplied to the engine 102, a manifold temperature signal indicating the temperature of the intake manifold (not shown in FIG. 1) of the engine 102, an ambient temperature signal indicating the temperature of the environment in which the engine system 100 is operating, and an engine coolant temperature signal indicating the temperature of the coolant supplied to the engine 102.

The final control command generation module 206 generates a final control command to be sent to the engine 102, the EGR system 104, or the exhaust gas treatment system 106. The final control command generation module 206 determines whether the engine 102 is operating in a cold start mode by, e.g., determining whether the temperature of the engine 102 is above a threshold temperature. In an embodiment, the final control command generation module 206 selects and sends out the cold start control command 226 as the final control command 228 if the engine 102 is operating in a cold start mode. If the engine 102 is not operating in a cold start mode, the final control command generation module 206 sends out the base control command 222 as the final control command 228. Alternatively or conjunctively, in another embodiment, the final control command generation module 206 blends the base control command 222 and the cold start control command 226 by, e.g., adding the two commands 222 and 226 if the engine is operating in a cold start mode.

When the final control command 228 is sent to one or more of the engine 102, the EGR system 104, and the exhaust gas treatment system 106, the recipient system or the engine operates as commanded. For instance, when the EGR system 104 receives the final control command 228 for controlling the EGR valve 114, the EGR valve 114 adjusts to allow the exhaust gas to flow at a rate specified in the final control command 228.

The sensors disposed in different locations of the engine system 100 generate one or more sensor signals 230 that result from applying the final control command 228. For instance, a flow rate sensor may detect the rate of the exhaust gas flow being recirculated into the engine 102 as a result of applying the final control command 114 that controls the EGR valve 114. In such a case, the sensor signal 230 indicates a measured, actual flow rate of the exhaust gas.

The diagnostic module 250 is configured to determine whether a performance goal or threshold of the CSER strategy implemented in the final control command 228 has been achieved by applying the final control command 228 to one or more components of the engine 102, the EGR system 104, and the exhaust gas treatment system 106. For instance, when the applied final control command 228 is for controlling the flow rate of the exhaust gas to be recirculated into the engine 102, the diagnostic module 250 determines whether the CSER strategy implemented in the final control command has effectively changed the flow rate of the exhaust gas. More specifically, in an embodiment, the diagnostic module 250 compares a first flow rate of the exhaust gas, which is a flow rate that would have been achieved by applying the base control command 222, and a second flow rate of the exhaust gas, which is a measured flow rate resulting from applying the final control command 228 implementing the CSER strategy.

In most cases, however, the first flow rate and the second flow rate are very close to each other in values. This makes it difficult to determine robustly whether the CSER strategy was effective based on a comparison of the first and second flow rates. In an embodiment, the diagnostic module 250 is configured to integrate the first and second flow rates over a period of time to determine the air masses. The diagnostic module 250 compares the air masses instead of comparing the close flow rates in order to determine whether the CSER strategy was effective or not erroneous.

In an embodiment, the diagnostic module 250 includes integration modules 208 and 210, a comparison module 212, an enabling module 214, an accumulation checking module 216, and a diagnostic code generation module 218. The enabling module 214 enables or activates the diagnostic module 250 when a set of enabling conditions in the input signals 220 and 224 is met. The enabling conditions may include an engine speed (e.g., in rotation per minute (RPM)) of the engine 102, a commanded fuel rate to the engine 102, an engine coolant temperature, an ambient temperature, an atmospheric pressure, and a combustion mode that indicates, e.g., whether the exhaust gas treatment system 105 is operating in a cold start mode. The enabling module 214 also determines whether the engine 102 is operating in a cold start mode. The enabling module 214 enables or activates the diagnostic module 250 if the engine 102 is operating in a cold start mode. When the enabling module 214 determines that the enabling conditions are met and the engine is operating in a cold start mode, the enabling module 214 sends control signals 232 and 234 to the integration modules 208 and 210, respectively, so that the integration modules 208 and 210 start generating accumulation signals as will be described below.

The integration module 210 takes as input the signal 230 resulting from applying the final control command 228 that implements a CERS strategy. The signal 230 specifies the actual output value measured by the sensors disposed in different locations of the engine system 100. The integration module 210 then generates an accumulation value by integrating the output values over a period of time. For instance, when the final control command 228 is for controlling the flow rate of the exhaust gas to be recirculated to the engine 102, the accumulation value is an air mass of the exhaust gas that has been recirculated to the engine 102 during the period of time. The integration module 210 starts integrating the signal 230 when the enablement module 214 sends the signal 234 to the integration module 210. Thus, the period of time starts at the time instance that the integration module 210 starts integrating in response to receiving the signal 234. The accumulation value generated by the integration module 210 indicates an air mass that has been recirculated to the engine 102 up to the time instance the accumulation value is generated—i.e., at the end of the period of time. The integration module 210 sends an accumulation value signal 240 to the comparison module 212.

The integration module 208 takes as input the base control command 222, which as described above specifies the output value that is expected to result from applying the base control command 222 to the engine 102, the EGR system 104, or the exhaust gas treatment system 106. The integration module then generates an accumulation value by integrating the output value specified in the base control command 222 over the same period of time, over which the integration module 210 integrates the signal 230. For instance, when the base control command 222 is for controlling the flow rate of the exhaust gas, the base control command 222 specifies the flow rate of the exhaust gas to be recirculated into the engine 102 when the engine is not operating in a cold start condition. The accumulation value generated by the integration module 208 indicates an estimated air mass of the exhaust gas that would have been sent to the engine 102 during the period of time. Like the integration module 210, the integration module 208 starts integrating the base control command 222 when the enablement module 214 sends the signal 232 to the integration module 208. The integration module 208 sends the accumulation value signal to the comparison module 212 and the accumulation checking module 216.

The accumulation checking module 216 determines whether the accumulation value signal 238 generated by the integration module 208 is larger than a threshold value. In an embodiment, this threshold value is a predetermined value. The accumulation value signal 238 being larger than the threshold value indicates that the amount of accumulation is large enough for performing determination of whether the CSER strategy is erroneous or not effective. The accumulation checking module 216 sends a signal 242 to notify the comparison module 212 to start comparing the accumulation value signals 238 and 240 from the integration modules 208 and 210, respectively.

The comparison module 212 compares to the accumulation value signals 238 and 240 to determine and track the difference between the accumulation value signals 238 and 240. Specifically, in an embodiment, the comparison module 212 determines whether the difference becomes larger than a threshold difference. For instance, when the final control command implementing the CSER strategy is for controlling the flow rate of the exhaust gas recirculated into the engine 102, the comparison module 212 determines whether the difference between the estimated air mass and the measured air mass generated by the integration modules 208 and 210, respectively, is larger than a threshold difference in air mass.

In an embodiment, the comparison module 212 determines the threshold difference to be compared with the difference between the accumulation signals 234 and 240, based on the base control command 222. In an embodiment, the comparison module 212 uses a lookup table indexed by the values of the base control command 222 to determine the threshold difference.

If the difference between the accumulation value signals 238 and 240 is larger than the threshold difference, the comparison module 212 determines that the CSER strategy implemented in the final control command 228 has achieved its performance threshold. If the difference is less than or equal to the threshold difference, the comparison module 212 determines that the CSER strategy did not achieve its performance threshold.

The comparison module 212 sends a status signal 244 that indicates whether the CSER strategy achieved its performance threshold to the diagnostic trouble code (DTC) generation module 218. The DTC generation module generates a DTC 236 based on the status indicated by the status signal 244.

As used herein, the term "module" or "sub-module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module or a sub-module can be embodied in memory as a non-transitory machine-readable storage medium readable by a processing circuit and storing instructions for execution by the processing circuit for performing a method. Moreover, the modules and sub-modules shown in FIG. 2 may be combined and/or further partitioned. For instance, the diagnostic module 250 may be a separate module from the control module 120.

Figure 3:
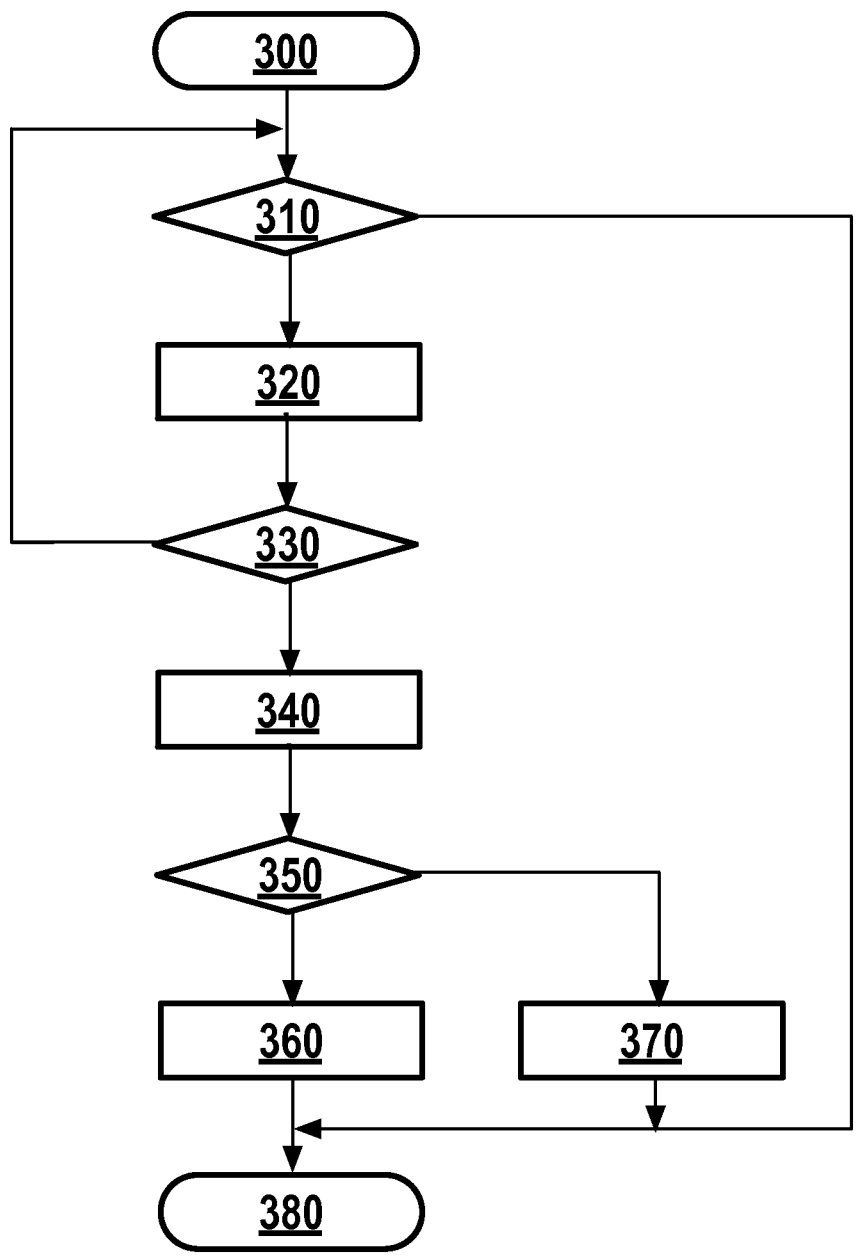
FIG. 3 is a flowchart illustrating a method in accordance with exemplary embodiments of the invention.

Referring now to FIG. 3, and with continued reference to FIGS. 1 and 2, a flowchart illustrates a method for monitoring outputs from the engine system 100 to determine whether a CSER strategy is effective. In an embodiment, the method can be performed by the control module 120 (more specifically, the diagnostic module 250) of FIGS. 1 and 2 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure. In an embodiment, the method can be scheduled to run based on predetermined events, and/or run continually during operation of the engine system 100.

In one example, the method may begin at block 300. At block 310, the control module 120 determines whether the final control command 228 implements a CSER strategy and whether a set of enabling conditions are met. In an embodiment, the control module 120 determines that the final control command 228 implements a CSER strategy when the engine 102 operates in a cold start condition. If the final control command 228 does not implement a CSER strategy or if not all of the enabling conditions are met, the method ends at block 380. If the final control command 228 implements a CSER strategy and all of the enabling conditions are met, the control module 120 proceeds to block 320.

At block 320, the control module 120 generates accumulation value signals 238 and 240 based on the base control command 222 and the signal 230, respectively. At block 330, the control module 120 determines whether an accumulation value signal generated based on the base control command 222 is over a threshold value.

If the control module 120 determines at block 330 that the accumulation value signal generated based on the base control command 222 is not greater than a threshold value, the control module 120 loops back to block 310. If the control module 120 determines at block 330 that the accumulation value signal generated based on the base control command 222 is greater than the threshold value, the control module 120 compares at block 340 the accumulation value signals 238 and 240 to determine the difference between the accumulation value signals 238 and 240.

At block 350, the control module 120 determines a threshold difference value based on a base control command 222 and determines whether the difference between the accumulation value signals 238 and 240 is greater than the threshold difference. In an embodiment, if the difference is greater than the threshold difference, the control module 120 determines at block 360 that the CSER strategy has been effective and optionally generates a DTC indicating the success. If the difference is less than or equal to the threshold difference, the control module 120 determines at block 370 that the CSER strategy has not been effective and optionally generates a DTC indicating the ineffectiveness. The method ends at block 380.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method for assessing a cold start emission reduction (CSER) strategy applied to an engine system, the method comprising:
   determining a first accumulation value based on an estimated output signal that would result from applying a first control command to the engine system;
   determining a second accumulation value based on a measured output signal resulting from applying a second control command that implements the CSER strategy to the engine system;
   comparing the first accumulation value and the second accumulation value; and
   determining whether the applying the second command to the engine system achieved a performance threshold of the CSER strategy based on the comparing,
   wherein the comparing comprises determining whether a difference between the first accumulation value and the second accumulation value is greater than a threshold value,
   wherein it is determined that the applying the second command to the engine system achieved the performance threshold if the difference is greater than the threshold value,
   wherein it is determined that the applying the second command to the engine system did not achieve the performance threshold if the difference is less than or equal to the threshold value, and
   wherein the first accumulation value includes an estimated air mass of exhaust gas that has been recirculated to the engine system, the second accumulation value includes a measured air mass of exhaust gas that has been recirculated to the engine system, and the second control command controls an actual flow rate of an exhaust gas from an engine of the engine system to recirculate back to the engine.

2. The method of claim 1 further comprising generating the second control command based on the first control command by applying the CSER strategy to the first control command.

3. The method of claim 1,
wherein the determining the first accumulation value comprises integrating the estimated output signal over a period of time,
wherein the determining the second accumulation value comprises integrating the measured output signal over the period of time.

4. The method of claim 1 further comprising determining whether the engine system meets a set of conditions, wherein the determining the first accumulation value and the determining the second accumulation value are performed if the engine system meets the set of conditions.

5. The method of claim 4, wherein the set of conditions includes at least one of an engine speed, an engine coolant temperature, an ambient temperature, an atmospheric pressure, and a combustion mode.

6. The method of claim 1 further comprising determining whether the first accumulation value is greater than a threshold accumulation value, wherein the comparing is performed if the first accumulation value is greater than the threshold accumulation value.

7. The method of claim 1 further comprising determining the threshold value based on the first control command.

8. The method of claim 1 further comprising generating a diagnostic trouble code (DTC) based on whether the applying the second command to the engine system achieved the performance threshold.

9. An engine system comprising:
an engine;
a control module for assessing a cold start emission reduction (CSER) strategy applied to the engine system, the control module comprising a processor coupled to a memory, the control module configured to:
determine a first accumulation value based on an estimated output signal that would result from applying a first control command to the engine system;
determine a second accumulation value based on a measured output signal resulting from applying a second control command that implements the CSER strategy to the engine system;
compare the first accumulation value and the second accumulation value; and
determine whether the applying the second command to the engine system achieved a performance threshold of the CSER strategy based on the comparison,
wherein the comparing comprises determining whether a difference between the first accumulation value and the second accumulation value is greater than a threshold value,
wherein it is determined that the applying the second command to the engine system achieved the performance threshold if the difference is greater than the threshold value,
wherein it is determined that the applying the second command to the engine system did not achieve the performance threshold if the difference is less than or equal to the threshold value, and wherein the first accumulation value includes an estimated air mass of exhaust gas that has been recirculated to the engine system, the second accumulation value includes a measured air mass of exhaust gas that has been recirculated to the engine system, and the second control command controls an actual flow rate of an exhaust gas back to the engine.

10. The engine system of claim 9, wherein the control module is further configured to generate the second control command based on the first control command by applying the CSER strategy to the first control command.

11. The engine system of claim 9,
wherein the determining the first accumulation value comprises integrating the estimated output signal over a period of time,
wherein the determining the second accumulation value comprises integrating the measured output signal over the period of time.

12. The engine system of claim 9, wherein the control module is further configured to determine whether the engine system meets a set of conditions, wherein the determining the first accumulation value and the determining the second accumulation value are performed if the engine system meets the set of conditions.

13. A diagnostic system for assessing a cold start emission reduction (CSER) strategy applied to an engine system, the diagnostic system comprising:
a first module configured to determine a first accumulation value based on an estimated output signal that would result from applying a first control command to the engine system;
a second module configured to determine a second accumulation value based on a measured output signal resulting from applying a second control command that implements the CSER strategy to the engine system;
a third module configured to compare the first accumulation value and the second accumulation value; and
a fourth module configured to determine whether the applying the second command to the engine system achieved a performance threshold of the CSER strategy based on the comparing,
wherein the first accumulation value includes an estimated air mass of exhaust gas that has been recirculated to the engine system, the second accumulation value includes a measured air mass of exhaust gas that has been recirculated to the engine system, and the second control command controls an actual flow rate of an exhaust gas from an engine of the engine system to recirculate back to the engine, and
wherein the fourth module determines whether applying the second command achieved the performance by:
comparing comprises determining whether a difference between the first accumulation value and the second accumulation value is greater than a threshold value,
determining that the applying the second command to the engine system achieved the performance threshold if the difference is greater than the threshold value, and
determining that the applying the second command to the engine system did not achieve the performance threshold if the difference is less than or equal to the threshold value.

14. The diagnostic system of claim 13,
wherein the first module is configured to determine the first accumulation value by integrating the estimated output signal over a period of time, wherein the second module is configured to determine the second accumulation value by integrating the measured output signal over the period of time.

15. The diagnostic system of claim 13 further comprising a fifth module configured to determine whether the engine system meets a set of conditions, wherein the first module determines the first accumulation value, and the second module determines the second accumulation value are performed when the fifth module determines that the engine system meets the set of conditions.

16. The diagnostic system of claim 13 further comprising a fifth module configured to generate a diagnostic trouble code (DTC) based on whether the applying the second command to the engine system achieved the performance threshold.

* * * * *